Aug. 21, 1951　　　　　G. HAHN　　　　　2,564,897
MACHINE FOR MANUFACTURE OF TELEVISION TUBES
Filed June 22, 1949　　　　　　　　　　2 Sheets-Sheet 1
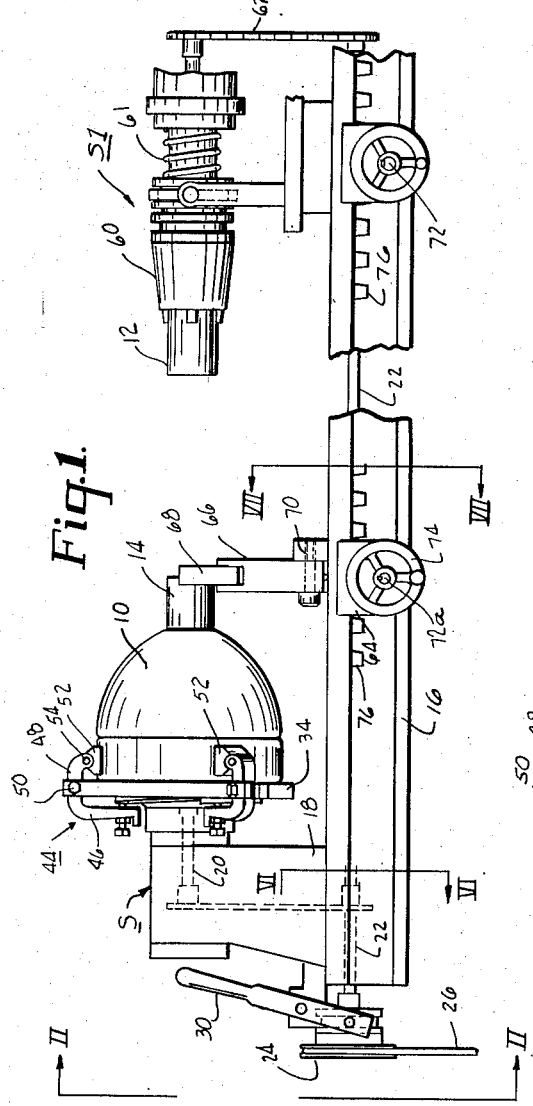
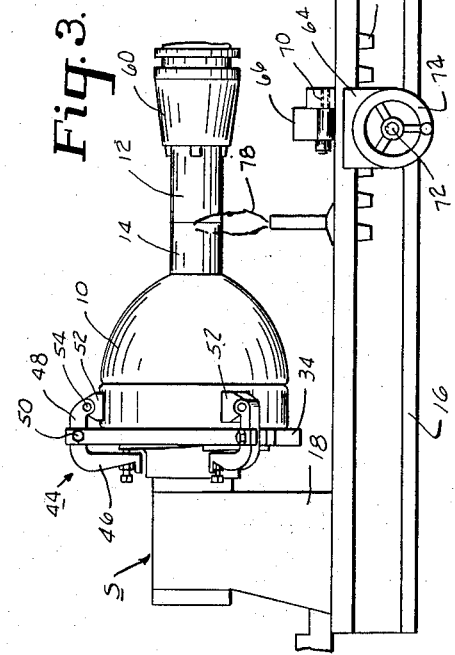
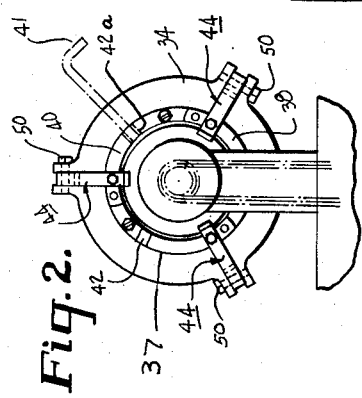
INVENTOR.
GEORGE HAHN
BY
Louis Necho
ATTORNEY Aug. 21, 1951   G. HAHN   2,564,897
MACHINE FOR MANUFACTURE OF TELEVISION TUBES
Filed June 22, 1949   2 Sheets-Sheet 2
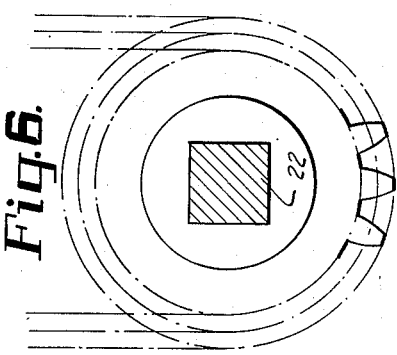
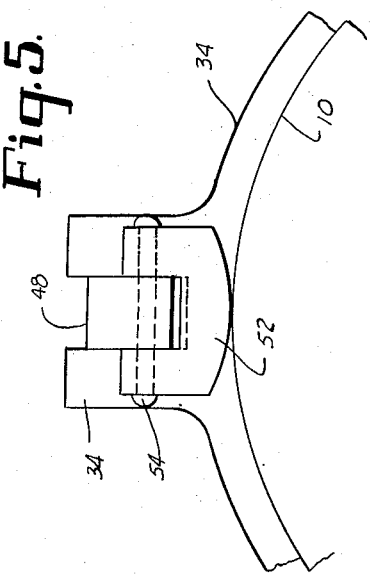
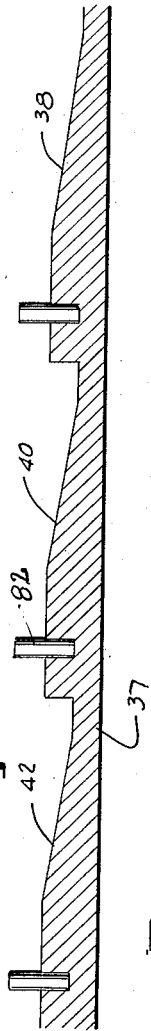
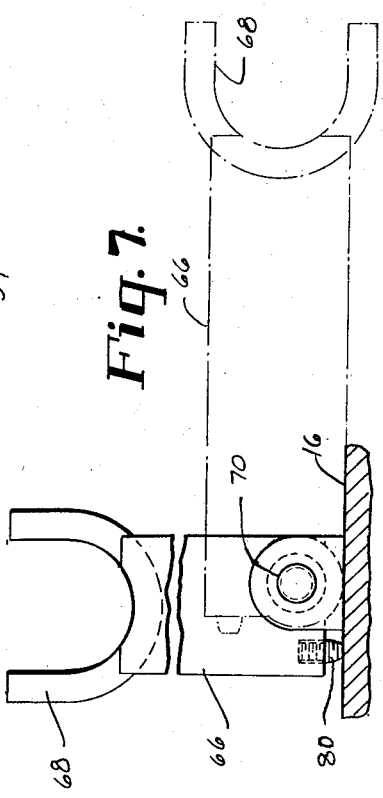
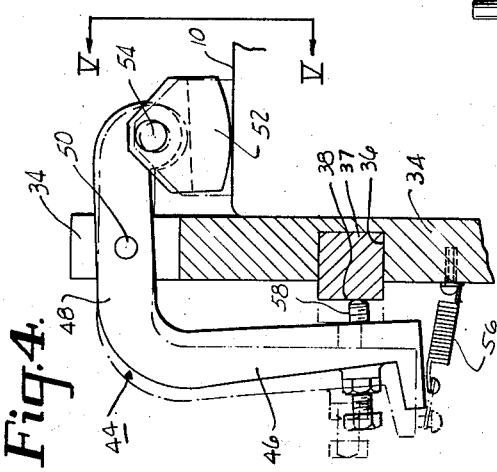
INVENTOR.
GEORGE HAHN
BY
Louis Necho
ATTORNEY Patented Aug. 21, 1951

2,564,897

UNITED STATES PATENT OFFICE 2,564,897

MACHINE FOR MANUFACTURE OF TELEVISION TUBES

George Hahn, Sharon Hill, Pa.

Application June 22, 1949, Serial No. 100,575

1 Claim. (Cl. 49—1)

A television tube includes a head which carries the viewing screen and which is in the form of a truncated cone, and a relatively long and substantially cylindrical neck. For convenience of manufacture, the head and neck are made separately with the small end of the head and with one end of the neck open. After the various components of the tube are installed in said head and neck, the open ends thereof are fused together to form a single unit.

The operation of integrating the head and neck of a television tube is carried out on a machine which resembles a lathe in that it has one stock for holding the large end of the head of the tube, another stock for holding the neck of the tube, one of said stocks being movable toward the other to bring the portions of the head and neck, which are to be fused together, into abutment, and means for rotating said head and neck while heat is applied to fuse the said abutting portions thereof.

The main object of the invention is to produce an improved machine of the type set forth.

As far as I know, machines of the type set forth now known or used are not wholly satisfactory due to the fact that, when the head of the tube is mounted in one stock of the machine and the neck of the tube in the other stock and the juxtaposed ends of the tubes are brought together, the abutting portions of the head and neck of the tube were not always in sufficiently accurate alignment or concentricity. This made it necessary to make corrections or adjustments so as to make sure that the head and neck of each tube are in proper alignment. The necessity of taking such precautions and making corrections and adjustments slowed production and increased costs.

It is therefore a further object of the invention to produce an improved machine of the type set forth whereby the necessary degree of alignment and concentricity between the head and neck of the tube is automatically assured thereby speeding production and decreasing costs.

These and other objects are attained by my invention as set forth in the following specification and as illustrated in the accompanying drawings in which Fig. 1 is a side elevational view of a machine embodying the invention the parts being shown as they appear before the operation of integrating the head and neck of the tube is begun.

Fig. 2 is a fragmentary, end elevational view looking in the direction of line II—II on Fig. 1.

Fig. 3 is similar to Fig. 1 but showing the parts as they appear during the operation of integrating the head and neck of the tube.

Fig. 4 is an enlarged, fragmentary view, partly in section and partly in elevation showing details of construction of the chuck which is shown at the left hand end of Figs. 1 and 3 and which is adapted to hold the head of the tube.

Fig. 5 is an enlarged, fragmentary elevational view looking in the direction of line V—V on Fig. 4.

Fig. 6 is an enlarged, fragmentary and diagrammatic view partly in section, partly in elevation, and partly in phantom looking in the direction of line VI—VI on Fig. 1.

Fig. 7 is an enlarged and fragmentary sectional view looking in the direction of line VII—VII on Fig. 1.

Fig. 8 is a developed sectional view of the cam arrangement forming part of the clutch which holds the head of the tube.

A television tube includes a generally frusto-conical head 10 and an elongated neck 12. For convenience, the head 10 and neck 12 are manufactured as separate parts and the head 10 is provided with an extension 14 to which the neck 12 is adapted to be welded as shown in Fig. 3.

As will be seen from Figs. 1, 2 and 3, my improved machine for the purpose stated includes a rail 16 mounted on a suitable support not shown and, in turn, supporting a fixed stock S adapted to support the head 10 of the tube, and a movable stock S1 adapted to support the neck 12 of the tube. The fixed stock S includes a bracket 18 fixed to the rail 16 and having a stub shaft 20 journalled therein. The shaft 20 is operatively connected by a belt, chain, or the like, to a shaft 22 which is driven by a pulley 24. The pulley 24 is driven by a belt or the like 26 actuated by a motor, or the like, not shown. A conventional fixed and loose pulley clutch is provided for connecting or disconnecting the stub shaft 20 from the shaft 22, the clutch being operated by a shifting lever 30 in the usual manner. Since this type of clutch is old and well known it is not illustrated in detail and it is only pointed out that when lever 30 is moved to the position of Fig. 1 the stub shaft 20 will not rotate and when the lever 30 is moved to an opposite position the shaft 20 will be rotated by shaft 22.

The stock S further includes a body member 34 which is rotatable by shaft 20 in any well known manner. The body 34 is provided with a slot 36 for receiving an annular cam member 37 having a plurality of cam surfaces 38, 40 and 42. The cam member is rotatable relative to the body 34 by means of a wrench or handle 41 adapted to engage a hole or recess 42a formed in said member.

The body 34 carries a plurality of equally spaced gripping fingers 44, which are adapted to hold the head 10 of the tube. These fingers are alike and the structure of only one of them will now be described.

As shown in Fig. 4, each finger includes a vertical portion 46 and a horizontal portion 48 and is pivoted to body member 34 as at 50. Each of the fingers 44 is provided with a cushioned gripping head 52 which is made of rubber or the like and which is pivoted to the end of the horizontal portion 48 of the finger as at 54. The lower end of the vertical portion 46 of each finger 44 is biased by a spring 56 toward the body member 34 or to the right as viewed in Fig. 4. In other words, the effect of the spring 56 is to urge the finger 44 to rotate in counter clockwise direction, as viewed in Fig. 4, so as to "open," or increase the space between the cushioned gripping members 52. The vertical portions 46 of each finger 44 is also provided with an adjustable feeler pin 58 which is adapted to ride over the cam surfaces 38, 40 or 42 as best shown in Fig. 4. By this arrangement, when a pin 58 rides over a low portion of a cam surface, the corresponding finger 44 carrying such pin will be rotated, in counter clockwise, by its spring 56. When the cam member 37 is rotated so that the pins 58 of the fingers 44 ride on the high portions of the cam surfaces, the fingers 44 will be rotated in clockwise or clamping direction.

The tail stock S1, which carries the neck 12 of the tube, includes a conventional, spring actuated chuck 60 which need not be shown in detail. It is sufficient to say that when the chuck is moved to the right as shown in Fig. 1, it assumes an open position permitting insertion of the neck 12 thereinto, and that the chuck 60 is biased to the left by a spring 61 to grip the end of the neck inserted therein.

The tail stock is movable over rail 16, toward and away from head stock S by means of a gear (not shown) on shaft 72. The gear engages rack 76 in the manner common to all lathes and the chuck 60 is rotated by means of a chain or belt 62 which is driven by shaft 22.

In order to insure proper alignment of the extension 14 of the head 10 with the neck 12 of the tube, I provide an auxiliary support for centering and supporting the extension 14 while the large end of the head 10 of the tube is being engaged by fingers 44. This auxiliary support includes a carriage 64 which is movably mounted on rail 16 and an arm 66 having a rounded seat 68 at the upper end thereof for receiving and seating the extension 14 of the head 10 of the tube as shown in Fig. 1. In order to be movable to an out of the way position when not in use, the arm 66 is hingedly secured to the carriage 64 as at 70. See Figs. 1 and 7.

By this construction, the arm 66 may be moved to the vertical position shown in Fig. 1 or to the horizontal position shown in broken lines in Fig. 7.

The carriage 64 is movable relative to the rail 16 by means of a gear (not shown) carried by shaft 72a which is rotated by a hand wheel 74. This gear engages rack 76 whereby the carriage 64 and arm 66 may be moved towards or away from the head stock S.

The operation is as follows:

The cam member 37 is rotated in one direction relative to the body member 34 until the pins 58 ride on the low portions of cams 38, 40 and 42. This allows fingers 44 to pivot in counterclockwise direction, as viewed in Fig. 1, and permits insertion of the large end of the head 10 of the tube between the gripping heads 52. Upon rotation of the cams in the opposite direction, the pins 58 will ride on the high portions of the cams, and the fingers 44 will move in clockwise direction to close the gripping heads 52 about the head 10 of the tube.

With the fingers 44 in their non-engaging position, the arm 66 is moved to a position in which it will underlie the extension 14 of the head 10 of the tube. The head 10 is now manipulated to insure that the extension 14 thereof is freely seated or cradled in the rounded seat 68 of the arm 66 and the cam member 37 is now rotated to cause the fingers 44 to close over the periphery of the head 10 of the tube whereby the pivotally mounted, self aligning gripping fingers 52 will firmly engage the head 10. When the head 10 is thus firmly engaged, the carriage 64 and the arm 66 are moved away from the head stock S until the rounded seat 68 is free of the stub 14 of the head of the tube. The arm 66 is now moved from its vertical to its horizontal position and the tail stock S1 is moved toward the head stock S to bring the end of neck 12 into contact with the end of extension 14. With both the head 10 and neck 12 of the tube rotating, a source of heat, such as a gas torch 78, is brought to bear at the junction of the neck 12 and extension 14 to fuse the same into a single unit.

By the arrangement described, the extension 14 and the neck 12 are always automatically aligned without any special skill or attention on the part of the operator.

The feeler pins 58 are threadedly engaged with the arms 44 to adjust or limit the movement of these arms in counterclockwise direction and the arm 66 is provided with a set screw 80 for adjusting the arm 66 and insuring seating of the extension 14 in the seat 68. In order to limit the movement of the cam member 37 relative to body member 34, one or more stops 82 are provided for abutting the fingers 44 or some other fixed element located in the path of movement of said stops.

What I claim is:

A machine of the type described including a head stock adapted to engage and support one object, a tail stock adapted to engage and support another object, an elongated horizontal track on which said stocks are mounted, means for moving one of said stocks towards or away from the other, a carriage movably mounted on said track and disposed intermediate said stocks, means for moving said carriage relative to said stocks, an arm, a seat carried by one end of said arm, and means hingedly connecting the other end of said arm to said carriage for rotation about an axis parallel to the axis of said track whereby said arm is movable to a horizontal position below said stocks and to a vertical position in which said seat is adapted to support said one object.

GEORGE HAHN.

REFERENCES CITED

The following references are of record in the file of this patent:

UNITED STATES PATENTS

| Number | Name | Date |
| --- | --- | --- |
| 1,676,795 | Mailey et al. | July 10, 1928 |
| 1,788,954 | Mailey et al. | Jan. 13, 1931 |